(12) United States Patent
Guerin et al.

(10) Patent No.: US 9,371,594 B2
(45) Date of Patent: Jun. 21, 2016

(54) DEVICE FOR EXTRACTING SHORT-CIRCUITING WEDGES DESIGNED FOR SWITCHING IN AN ELECTROLYSIS CELL FOR THE PRODUCTION OF ALUMINUM

(75) Inventors: Jérôme Guerin, Lambersart (FR); Alain Rose, Beaucamps Ligny (FR); Frédéric Brun, Saint Jean de Maurienne (FR); Serge Despinasse, Fontcouverte-La Toussuire (FR)

(73) Assignee: Fives ECL, Ronchin (FR)

( * ) Notice: Subject to any disclaimer, the term of this patent is extended or adjusted under 35 U.S.C. 154(b) by 482 days.

(21) Appl. No.: 13/806,459

(22) PCT Filed: Jun. 23, 2011

(86) PCT No.: PCT/FR2011/000358
§ 371 (c)(1),
(2), (4) Date: Dec. 21, 2012

(87) PCT Pub. No.: WO2012/001243
PCT Pub. Date: Jan. 5, 2012

(65) Prior Publication Data
US 2013/0098773 A1 Apr. 25, 2013

(30) Foreign Application Priority Data

Jun. 28, 2010 (FR) ...................................... 10 02688

(51) Int. Cl.
*C25C 3/16* (2006.01)
*C25C 7/06* (2006.01)
(Continued)

(52) U.S. Cl.
CPC .................. *C25C 7/06* (2013.01); *B23P 19/025* (2013.01); *C25C 3/16* (2013.01); *C25C 7/005* (2013.01)

(58) Field of Classification Search
CPC ............................. B23P 19/025; B23P 19/027
See application file for complete search history.

(56) References Cited

U.S. PATENT DOCUMENTS 3,059,905 A * 10/1962 Tompkins ................. E02D 9/02
254/132
4,078,766 A * 3/1978 Saurwein ........................ 254/18
(Continued)

FOREIGN PATENT DOCUMENTS

| CN | 201010699 Y | 1/2008 |
| EP | 2080820 A1 | 7/2009 |
| FR | 2583069 A1 | 12/1986 |

OTHER PUBLICATIONS

International Search Report mailed Dec. 6, 2011 (PCT/FR2011/000358); ISA/EP.
(Continued)

*Primary Examiner* — Harry D Wilkins, III
(74) *Attorney, Agent, or Firm* — Banner & Witcoff, Ltd.

(57) ABSTRACT

Extraction device designed to extract a short-circuiting wedge inserted between two conductors to take an electrolysis cell offline. The extraction device includes a means of gripping said wedge and, in conjunction with the upper horizontal face of each conductor, at least one jack directed vertically and including a body and a stem,
a) stem (or said body) being interdependent with at least one horizontal support face directed downwards and laid out so that, when said extraction device is placed above said wedge to extract it, the upper horizontal face of each conductor is in line with one horizontal support face,
b) said body (or said stem) being connected to said means of gripping said wedge, so that, when said jack is actuated to extract the wedge, said jack exerts opposing forces on said conductors and said wedge, tending to separate them.

15 Claims, 2 Drawing Sheets

(51) Int. Cl.
  *B23P 19/027* (2006.01)
  *B23P 19/02* (2006.01)
  *C25C 7/00* (2006.01)

(56) References Cited

U.S. PATENT DOCUMENTS

| | | | |
|---|---|---|---|
| 4,086,692 A * | 5/1978 | Theurer | 29/252 |
| 4,230,794 A * | 10/1980 | McCarthy | 430/323 |
| 4,249,293 A * | 2/1981 | Schulberg | 29/252 |
| 4,295,635 A * | 10/1981 | Pustka et al. | 254/93 HP |
| 4,431,492 A | 2/1984 | Arita et al. | |
| 4,442,593 A * | 4/1984 | Holmberg | 29/825 |
| 4,713,161 A | 12/1987 | Chaffy et al. | |
| 5,566,924 A * | 10/1996 | Shirk | 254/18 |
| 6,113,073 A * | 9/2000 | Lefavour et al. | 254/18 |
| 6,481,691 B1 * | 11/2002 | Irving | 254/28 |

OTHER PUBLICATIONS

International Search Report mailed Dec. 6, 2011 (PCT/FR2011/000357); ISA/EP.

\* cited by examiner

DEVICE FOR EXTRACTING SHORT-CIRCUITING WEDGES DESIGNED FOR SWITCHING IN AN ELECTROLYSIS CELL FOR THE PRODUCTION OF ALUMINUM

The present application is a U.S. National Phase filing of International Application No. PCT/FR2011/000358, filed on Jun. 23, 2011, designating the United States of America and claiming priority to French Patent Application No. 1002688, filed Jun. 28, 2010, and claims priority to and the benefit of all the above-identified applications, which are incorporated by reference herein in their entireties.

The invention relates to the field of aluminum production using igneous electrolysis by means of the Hall-Héroult process. It concerns devices for the electrical connection of electrolytic cells for the production of aluminum by igneous electrolysis. It more particularly relates to equipment which is used during the switching-in operation of a cell taken temporarily out of service, an operation also called "restarting", and which makes it possible to remove short-circuiting wedges placed between the cathode assembly of said cell and the cathode assembly of the adjacent upstream cell. In the following, such equipment will be referred to as a "wedge extraction device" or "extractor".

Aluminum is produced industrially by igneous electrolysis, using the well-known Hall-Héroult process, in electrolysis cells. The plants contain a great number of electrolysis cells laid out in line, in buildings called electrolysis halls or rooms, and electrically connected in series using connecting conductors, in order to make the best use of the floor area of the plants. Each electrolytic cell comprises a pot provided with a cathode assembly and an anode system. The pot comprises a steel pot shell, elements of refractory material lining and a cathode assembly located at the bottom of the pot, formed by the juxtaposition of carbonaceous blocks in which are sealed metal bars whose ends protrude from the pot shell. Each pot also comprises an anode system formed by at least one rigid beam, which supports one or more horizontal conducting bars, called an "anode frame", on which are fixed the anode hanger rods made of carbonaceous material which are partially immersed in the electrolytic bath.

The cells are generally laid out so as to form two or more parallel lines which are electrically linked to each other by end conductors. Conventionally, electric current flows from the cathode of an upstream cell towards the anode of a downstream cell. The connecting circuit between two successive cells includes a circuit carrying the electrolysis current, made up of cathode collectors connected both to the cathode outputs of a cell of a given row (n) and to "anode risers", themselves connected to the rigid beam and the anode frames of the adjacent downstream cell, of row (n+1).

From time to time, one or more cells of a series must be shut down. This shutdown is performed by connecting the cathode collector of a given cell to the connecting conductor which connects the cathode outputs of the adjacent upstream cell to the "anode risers" which power the anode frame of said cell. Connection is made via a plurality of conducting wedges, typically made of aluminum, such as those mentioned in patent FR 2.583.069 (see FIG. 8, element marked 12): in such a configuration, the cathode collector of the cell and the connecting conductor between the cathode of the upstream cell and the anode of said cell appear locally as two conductors with a substantially rectangular section, each of which has at least one horizontal upper face and one substantially vertical face, the substantially vertical face of one conductor being placed opposite that of the other, the two substantially vertical faces thereby delimiting an air-gap designed to receive a short-circuiting wedge, itself including two substantially parallel faces, which converge slightly towards the bottom when the wedge is placed so as to occupy said air-gap.

In order to shut down the cell, the wedges must be inserted between the conductors in order to provide a contact surface that gives as low as possible an electrical resistance. In practice, to ensure a good electrical contact, these wedges are introduced into the air-gap between the conductors, while these are themselves retained by bolted ties.

To switch in the cell, said wedges must be withdrawn, so as to isolate said conductors from each other, the current flowing from the upstream cell passing once more through the anode risers to power the anode frame of the adjacent downstream cell. To remove the wedges without having to supply too great a force, it is in general necessary to at least partially unbolt said ties. The wedges are then pulled to the top so that they leave the air-gap engineered between the conductors.

Until now fitting and removing these wedges required tricky human intervention, involving either shutting down the series for the time necessary for the operation, which is detrimental to the output of the series, or, preferably, an intervention of very limited duration. If the wedges are withdrawn without the series being shut down, and as all the wedges cannot be removed instantaneously, the intensity of the current which flows in the wedges that are still in place increases gradually, causing them to significantly overheat, so that the last wedges removed may reach high temperatures. A high wedge temperature may have detrimental consequences, such as having to exert a higher extraction force because they have dilated, or leading to significant damage to the contact surfaces. So the intervention must be as short as possible to limit overheating of the last wedges to be removed.

Moreover, safety requirements mean that operators have to remain at ground level, in particular when they are working on said wedges. Around current electrolytic cells, passages are arranged to facilitate various work on the cell. These passages are roughly on the same level as the surface of the bath. For safety reasons, the cathode collectors and the connecting conductors are located below these passages. The conductors and the air-gaps designed to receive the wedges are therefore laid out below these passages but they must be accessible from these passages, during the operations necessary for momentarily shutting down or switching in the cell.

To save time during these operations, it has been attempted to remove the wedges using a hoist placed on a traveling crane moving in the electrolysis hall, above the cells. To achieve this, short-circuiting wedges provided with ladle pins have been used and the hoist was provided with a U-shaped sling designed to be hung from the wedge pins. The hoist made it possible to develop significant forces, typically about 10 tons, but these were insufficient if the ties were not at least partially unbolted beforehand. This led to a significant waste of time because the ties could only be unbolted from ground level, with a long-handled tool with only limited rotation possibilities. In addition, when, in spite of the force transmitted, the wedge still adhered to the conductors, the hoist ultimately lifted up anyway, entraining and damaging the conductors. Lastly, such a practice raised major safety issues, because the wedges, which have a certain mass, typically a few tens of kilograms, were expelled along a more-or-less controlled upward trajectory, and likely to pass near the operators.

The applicant has developed a process for extracting wedges which does not have the disadvantages referred to above, in which an extractor is used which acts on the wedges without any need to unbolt the ties, exerts a significant effort during wedge extraction without leading to the least risk of damage to said conductors and, finally, makes it possible to control the ejection trajectory of said wedges.

A first subject according to the invention is an extraction device designed to extract a short-circuiting wedge, said wedge having been inserted between two conductors to take an electrolytic cell off line, each conductor having at least one upper horizontal face and one substantially vertical face, the substantially vertical face of a conductor being placed opposite that of the other, the two substantially vertical faces thereby delimiting an air-gap designed to receive said short-circuiting wedge, itself comprising two substantially parallel faces, which converge slightly to the bottom when said wedge is placed so as to occupy said air-gap, said device including a means of gripping said wedge and characterized in that it includes, in conjunction with the upper horizontal face of each conductor, at least one jack directed vertically comprising a body and a piston associated with a piston stem, a) said stem (or said body) having at least one horizontal support face directed downwards and laid out so that, when said extraction device is placed above said wedge to extract it, said upper horizontal face of the conductor is in line with said horizontal support face, b) said body (or said stem) being connected to said means of gripping said wedge, so that, when said jack is actuated to extract the wedge, said jack exerts opposing forces on said conductors and said wedge, tending to separate them.

By using the wedge extraction device according to the invention, an electrolytic cell can be switched in by isolating the conductors, together with the cathode elements of two adjacent cells, from each other, without damaging them: the force compensating for the force which tends to separate the wedge from the conductor is the resultant of forces exerted directly on the upper horizontal face of each conductor, which makes it possible to prevent the conductors from lifting up and becoming damaged, should the extraction force be insufficient to detach the wedge from the conductors. This device, able to provide forces greater than those of prior art without damaging the conductors, is all the more appropriate as the wedge is strongly held between two conductors retained by ties.

As previously indicated, the two conductors opposite each other are:

a first conductor, which is a connecting conductor between the cathode output of the cell directly upstream and the anode riser which supplies the anode frame of said cell, a second conductor, which is a cathode collector element of said cell.

The extraction device according to the invention includes at least one jack that is placed so that it can, when actuated, exert opposing forces on the wedge and a conductor. Each of the two parts of the jack, which are mobile in relation to each other (body and stem), may be associated either with the wedge or with the conductor. The first part of the jack (the body or the stem) is interdependent with at least one horizontal support face designed to come in line with the upper horizontal face of a conductor. The second part of the jack (the stem or the body) is connected to the means of gripping the wedge, at least temporarily, when the jack is actuated to extract the wedge. In other words, this second part of the jack may be mobile in relation to said means of gripping in certain phases of use of the extraction device but it must come into contact with this means of gripping and entrain it when the jack is actuated in order to exert the separating forces.

The means of gripping the wedge advantageously includes a fixing part on which means of fixing are fastened, working in conjunction with complementary means of fixing engineered on the wedge, preferably on the top part of the wedge which is designed to remain above the air-gap of the conductors when the wedge is inserted into it and which is therefore more easily accessible. For example, on the top part of the wedge at least one substantially horizontal bore is engineered, designed for a locking axle, interdependent with the fixing part, to pass through it. The locking axle(s) is (are) actuated by one or more auxiliary actuators, which are themselves fixed to said fixing part and which cause said axles to move so that they can fit into said bore so as to grip the wedge.

Advantageously, the diameter of the locking axle is as close as possible to that of the bore with which it is associated, and, to provide a better force distribution, the locking axle also passes through the bores of two brackets interdependent with said means of fixing, placed so that in fixing position, said brackets are located on either side of said wedge. To make it easier to insert the locking axle, a diameter significantly lower than that of the bore may be chosen, while engineering on said locking axle, at the level of the zone designed to come into contact with the bore, a surface portion whose radius of curvature is larger, close to the radius of the bore.

In practice, the conductors are placed opposite each other so that the wedge is placed vertically and the extractor can therefore be set up at the level of the wedge to be extracted using a transporting and lifting device, of the traveling crane/carriage/hoist type. But the invention remains significant if the pair of horizontal and vertical directions mentioned is replaced by any pair of perpendicular directions, each wedge needing to have an upper face that is substantially perpendicular to the direction of the force which must be applied to separate them, which must be substantially parallel to the faces that are opposite the conductors. This naturally supposes that the handling device designed to place said device in line with the wedges is adapted to such a frame of reference.

The extraction device according to the invention includes at least two jacks with the characteristics specified above, each conductor being associated with at least one jack. These jacks may be electric jacks, typically powered by a circuit with a variable speed drive, but, preferably, they are hydraulic actuating cylinders, because the latter, for a given size, are able to exert a greater force. Advantageously, the hydraulic actuating cylinders are powered by the same hydro-electric unit, which is preferably mounted on said extraction device or the handling device of said extraction device.

According to the invention, the stem (or the body) of said jacks is interdependent with at least one horizontal support face directed downwards and laid out so that, when said extraction device is placed above said wedge to extract it, said horizontal support face arrives opposite the upper horizontal face of the conductor and is brought into direct contact with said upper horizontal face. The stem (or body) may be directly provided with said horizontal support face. Advantageously, the end face of the stem (or the lower face of the body) is covered with a shoe which presents said horizontal support face, said shoe being made of a material which is electrically resistant and able to resist the forces transmitted mechanically. In this way, said shoe makes it possible to ensure electrical insulation of the extraction device in relation to the conductors.

The jacks are placed near the conductors and exert their forces directly on the upper horizontal faces of said conductors, without there being any need to interpose one or more adaptors between the jacks and the conductors. It follows from this that the extraction device is compact, light, easy to handle and quick to position above the conductors, in line with the wedges to be removed. The extraction device according to the invention makes it possible to carry out the extraction operation more quickly than in prior art, so that it is possible to much more effectively limit heating of the last wedges during switching-in of an electrolytic cell.

In addition, the fact of having at least one jack in line with each conductor makes the extraction device according to the invention more flexible and safer to use. At least one jack can therefore be positioned opposite each conductor, and each of these jacks can be actuated in order to take up the difference in levels which may exist between the upper horizontal faces of the conductors. Advantageously, the jacks all are powered by the same hydraulic circuit, and they move forward with the same speed but over a longer or shorter travel according to the altitude of the upper horizontal face of the conductor with which each is associated, which enables them to be positioned automatically at the right height. In this way, the extraction device can remain properly positioned and exert its extraction force in a substantially vertical direction. In contrast, with a jack interdependent with only one support face (or two support faces interdependent with each other) which rests against the two conductors, there is a risk, in the event of major difference in levels between said upper horizontal faces, of having an incorrectly positioned device likely to exert a force in a direction far from the vertical, which increases the risk of removing the wedges along a poorly-controlled trajectory. It follows from this that the extraction device according to the invention makes for mechanically stable, safe wedge extraction, the trajectory along which the wedges are removed being perfectly controlled.

Correcting the differences in levels is done advantageously by converting the hydraulic circuit which supplies said jacks. With a circuit corresponding to a system known by the name of "hydraulic pressure booster", including a low-pressure unit and a pressure intensifier, it is possible, with low on-board power, to carry out rapid gap adjustment, the jacks functioning under low pressure and at a high flow rate; then, when once the gaps have been corrected, to extract the wedge by exerting the necessary extraction forced, all the jacks functioning together under high pressure, with a low flow rate.

A hydraulic circuit can also be designed which does not call upon the circuit known as a "hydraulic pressure booster". For example, a double Low Pressure/High pressure pump can be used, whose principle is frequently used for applications where full pressure and maximum flow are not simultaneously required. The circuit is such that, during work at low pressure, the two pump flows are added to provide maximum speed to the receiver. As soon as the jack encounters an obstacle, the resistance generates a pressure corresponding to the setpoint of a valve called a "line breaker". This opens and sets the flow of the low-pressure pump to return. A check valve placed downstream of the line breaker isolates the two circuits and only the high-pressure pump outputs to the receiver. The high pressure is made safe by a pressure limiting device. In the event of a drop in pressure after the rise in pressure and as soon as the latter arrives at the level of the setpoint of the valve known as a "line breaker", the latter opens and the two flows are again available under low pressure. Such a circuit making it possible to have full power available at any time has the advantage of using readily-available equipment, operating in a tested, simple way. In addition, the break threshold of disjunction can be adjusted to optimize power. However, the level of installed capacity necessary for the device to operate correctly is greater than in the previous solution. Lastly, it is also possible, instead of associating a low pressure unit and an intensifier ("hydraulic pressure booster"), to associate a high pressure hydraulic mini-unit and an accumulator.

Advantageously, said extraction device according to the invention is provided with two pairs of jacks, each couple being associated with a conductor. Such a layout, shown in the example below, allows the passage of a lateral locking axle between two jacks (to give a more compact circuit and better load distribution).

In a preferred embodiment of the invention, said extraction device also includes an actuator designed to raise the unit including the wedge, the means of gripping the wedge and the jacks, as soon as the wedge has been extracted, i.e. as soon as it is no longer held in place by the conductors. This actuator acts as an ejector: the unit including the wedge, the means of gripping the wedge and the jack(s) must be removed so that the wedge can completely leave the air-gap between the conductors opposite each other as quickly as possible, at a speed significantly higher than that of the stem of a hydraulic actuating cylinder. For the unit including the wedge, the means of gripping the wedge and the jack(s), it is attempted to find as high an ejection speed as possible because this makes it possible to limit the risk of an electric arc appearing as the wedge rises.

Advantageously, said actuator is a pneumatic jack. To distinguish them from this auxiliary jack acting as an ejector, said jack or jacks are called "support jacks". Advantageously, the means of gripping the wedge is interdependent with the stem (or the body) of said actuator and the stem travel of said actuator is long enough to allow said wedge to completely leave the conductor air-gap.

In a preferred embodiment, the support jacks and the actuator operate simultaneously. There is then no need to synchronize the actions of the support jacks and the actuator: as the extraction force exerted on the wedge, provided by the support jacks, is substantially greater than the force supplied by the actuator, it is applied only until the wedge breaks away from the conductors, at which point only the raising force of the actuator is operative.

Advantageously, said extraction device includes a frame on which said actuator is fixed. Said frame includes means of fixing, so that it can be handled by transport and lifting means. Typically, the means used for transporting and lifting said extraction device are an association of traveling crane, carriage and hoist. To extract a wedge, the device is placed, using said transport and lifting means, in line with the conductors and it is placed in such a way that the horizontal support face of each jack rests on an upper horizontal face of the conductor associated with said jack. During extraction, the extraction device may or may not be held by the transport and lifting means.

Advantageously, said frame is provided with means of centering which make it possible to guide said extraction device during its vertical move downwards towards a predefined position in relation to said conductors, the support faces being placed in line with the upper horizontal faces of said conductors.

Advantageously, said frame also includes fairing which delimits the space in which the unit including the wedge and the means of gripping the wedge must move after said wedge has been extracted and which provides protection for the operators working near the extractor against the extracted moving parts.

Advantageously, said extraction device is also provided with a substantially vertical means of guidance, which makes it possible to guide said means of gripping the wedge as the extracted unit rises (wedge, means of gripping the wedge, jack(s)), which makes it possible to control its trajectory when it is being ejected, in particular when the wedge is still at the level of the air-gap between the conductors: this prevents the wedge from coming back into contact with the conductors and limits the risk of an electric arc appearing.

Advantageously, said device is also provided with a cooling box, which is placed above the wedge and the top of which is equipped with a cooler operating by Venturi effect, the air flow so generated being directed towards said wedge.

The extraction device, as described previously, is designed to be used to extract only one wedge. It is understood that the principles stated above may apply to an extraction device used to extract several wedges simultaneously, this latter becoming inevitably heavier, more cumbersome and slower to handle, but also helping to prevent overheating since several wedges can be removed at the same time.

Another subject according to the invention is an extraction process for short-circuiting wedges used during restarting an electrolytic cell temporarily taken out of service, consisting in removing the short-circuiting wedges which were inserted between two conductors to take said electrolytic cell off line, the first conductor being associated with the cathode assembly of said cell and the second conductor being associated with the cathode assembly of the adjacent upstream cell, each conductor having at least one upper horizontal face and a substantially vertical face, the substantially vertical face of a conductor being placed opposite that of the other, the two substantially vertical faces therefore delimiting an air-gap designed to receive said short-circuiting wedge, itself including two substantially parallel faces, which converge slightly to the bottom when said wedge is placed so as to occupy said air-gap, said process being characterized in that the device according to the invention is used to extract said wedge.

Advantageously, as work needs to be carried out as quickly as possible to limit heating of the last wedges to be removed, several devices according to the invention are used simultaneously to extract some or all of the wedges which were fitted when taking an electrolytic cell off line. The extraction device referred to above can also be used, which makes it possible to extract several wedges simultaneously.

Figure 3:
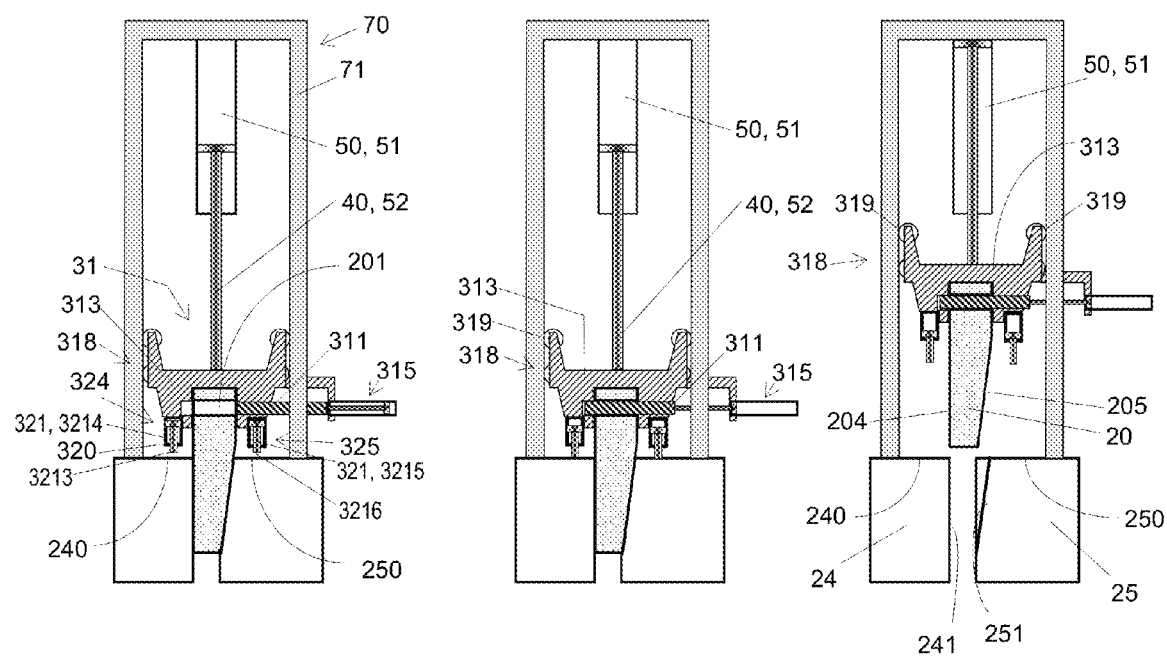

FIGS. 3a, 3b and 3c schematically illustrate a particular embodiment of the wedge extraction device according to the invention. FIG. 3a shows said extraction device when it is fitted to the conductors, at the level of the wedge to be extracted. FIG. 3b shows said extraction device when the means of gripping the wedge have been actuated. FIG. 3c shows said extraction device when the wedge has been extracted and is still in place, resting against the conductors, at the level of the wedge which has just been extracted.

Figure 1:
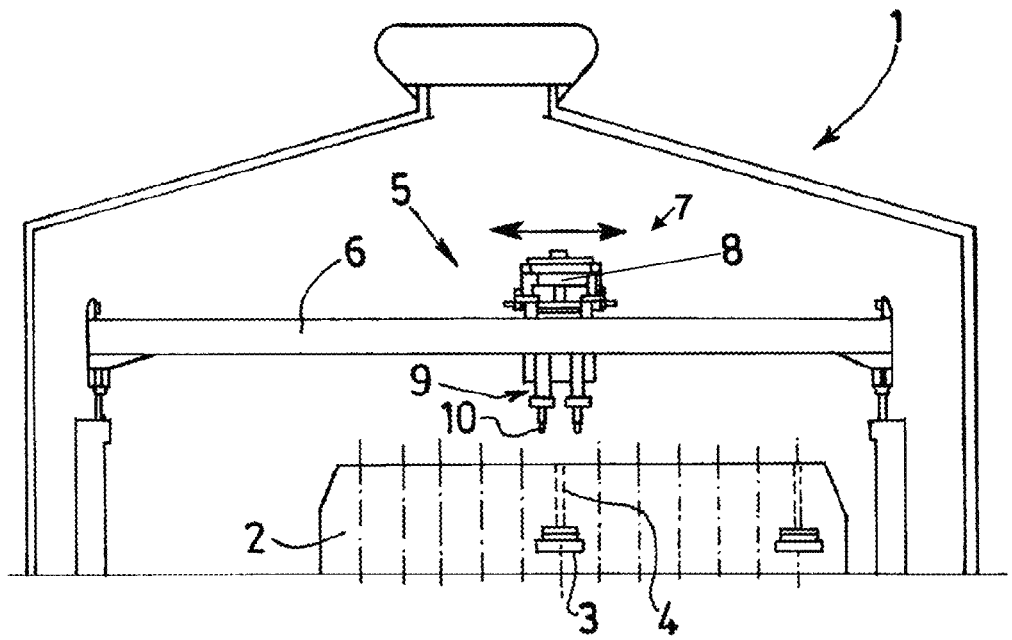
FIG. 1 is a schematic cross-sectional view of a pot tending machine in a typical electrolysis hall for the production of aluminum.
Figure 2:
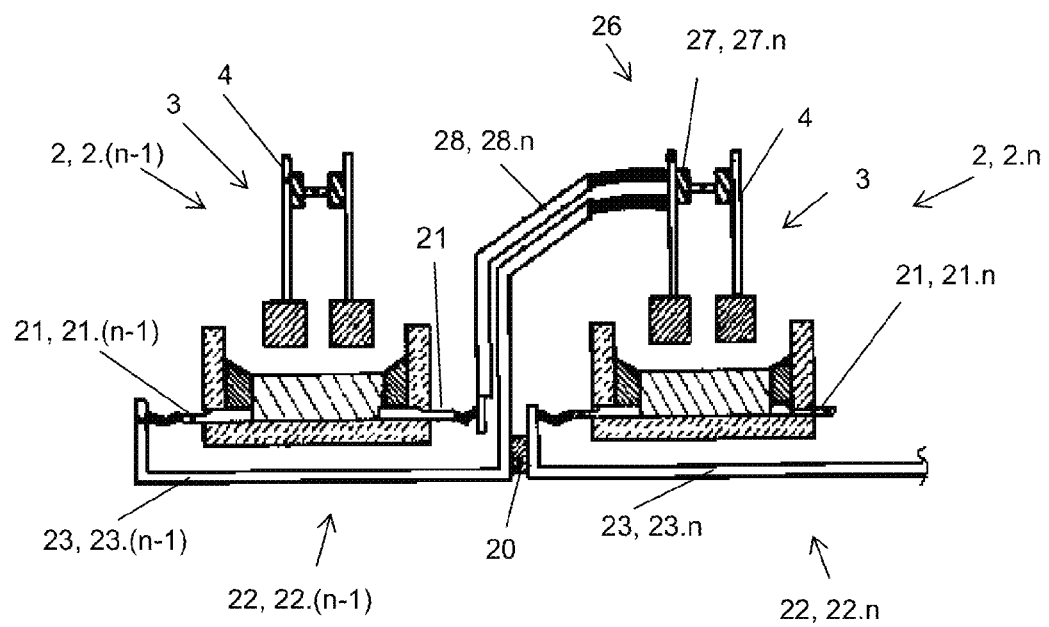
FIG. 2 is a schematic view of the layout of the connecting conductors between two neighboring cells.

Electrolysis plants designed for aluminum production include one or more electrolysis halls. The electrolysis hall (1) illustrated in FIG. 1 comprises electrolysis cells (2) and a pot tending machine (5). The electrolysis cells (2) are normally laid out in row or lines, each row or line typically comprising over a hundred cells. The cells (2) are laid out so as to leave an aisle throughout the length of the electrolysis hall (1). Cells (2) include a series of anodes (3) provided with a metal stem (4) for fixing the anodes and connecting them electrically to a metal anode frame (27). Each cell (2) comprises a cell provided with a cathode assembly (22) and an anode system (26). The cell comprises a steel pot shell and elements of refractory material lining. The cathode assembly (22) located at the bottom of the cell, is formed by the juxtaposition of carbonaceous blocks in which are sealed metal bars whose ends (21) protrude from the pot shell and are connected to each other by a cathode collector (23). The connecting circuit between two successive cells (2.($n-1$) and 2.$n$) includes a circuit for carrying the electrolysis current where the cathode collector (23.($n-1$)) is connected to the cathode outputs (21.($n-1$)) of a cell in a given row (2.($n-1$)) and also to anode risers (28.$n$), themselves connected to the anode frames (27.$n$) of the adjacent downstream cell (2.$n$).

From time to time, one or more cells of a series must be shut down. This shutdown is performed by connecting the cathode collector (23.$n$) of a given cell (2.$n$) to the connecting conductor which connects the cathode collector (23($n-1$)) of the adjacent upstream cell (2.($n-1$)) to the anode risers (28.$n$) which power the anode frame of said cell. Connection is made via a plurality of conducting wedges (20), typically made of aluminum, inserted by force into different places where the two conductors have two substantially vertical faces opposite each other. To switch in the cell, all the wedges must be removed in as short a time as possible. The device according to the invention makes it possible to remove the wedges one by one. It is compact and light and can be moved quickly in line with each wedge. It can exert a large extraction force making it possible to detach each wedge from the conductors.

EXAMPLE OF AN EMBODIMENT (FIGS. 3a, 3b and 3c)

The extraction device (30) illustrated in FIGS. 3a), 3b) and 3c) is designed to extract a short-circuiting wedge (20), which was inserted between two conductors (24 and 25) to take an electrolytic cell off line. The first conductor (24) is a connecting conductor between the cathode output (23.($n-1$)) of the cell directly upstream and the anode riser (28.$n$) which supplies the anode frame (27) of said downstream cell (2.$n$). The second conductor (25) is a portion of the cathode collector (23.$n$) of said downstream cell (2.$n$). Each conductor (24, 25) has at least one upper horizontal face (240, 250) and a substantially vertical face (241, 251). The substantially vertical faces (241, 251) are placed opposite each other, therefore delimiting an air-gap designed to receive said short-circuiting wedge, itself including two substantially parallel faces (204, 205), which converge slightly downwards.

The extraction device (30) includes a means of gripping (31) of said wedge and two pairs of jacks, each couple being represented by a jack (324 and 325 respectively) illustrated in FIGS. 3a) 3b) and 3c). Each jack, directed vertically, includes a body (320) and a piston with which a piston stem (321) is associated. The body (320) of each jack is interdependent with the means of gripping (31). The free end of the piston stem (3214, 3215) of each jack (324, 325) has a horizontal support face (3213, 3216) which is directed downwards and which is laid out so that, when said extraction device is placed above said wedge (20) to extract it, said horizontal support face (3213, 3216) is in line with the upper horizontal face (240, 250) of the conductor (24, 25) associated with the pair of jacks to which said jack belongs.

Each one of these jacks is a double-acting jack powered by a hydraulic unit fixed onto the frame (70) of the extraction device (30). The hydraulic circuit includes a low pressure unit and a pressure intensifier connected to the circuit powering the chamber on the piston side. In this way, with low on-board power, it is possible to initially carry out rapid correction of the differences in levels, all the jacks operating at low pressure and with a high flow rate as long as the horizontal support face (3213, 3216) of the last stem has not come into contact with the upper horizontal face (240, 250) of a conductor (24, 25). Then, when once the gaps have been corrected, a distributor is actuated so that the chamber on the piston side is supplied with oil from the circuit passing through the pressure intensifier. The wedge can then be extracted, all the jacks operating together at high pressure, with low flow and exerting, on conductors (24, 25) and on wedge (20), opposing forces tending to separate them.

To make it easier to extract, wedge (20) and said extraction device (30) are provided with means of gripping working in conjunction with each other. The extraction device (30) includes, as a means of gripping (31) the wedge, a fixing part (313) globally in the shape of an upside-down U, the legs of the U being placed on either side of the wedge and provided with aligned bores designed for a locking axle (311) to pass through them, this axle being laid out laterally and moving in the common plane of symmetry of the jacks in the pairs of jacks. The top part of wedge (20), designed to remain above the air-gap of the conductors, has a horizontal bore (201) passing through the entire thickness of the wedge. The locking axle (311) is actuated by a jack (315) which inserts said locking axle inside bore (201) of the wedge and the bores of the legs of the fixing device (313) to grip the wedge (FIG. 3b)). The fixing part (313) is fixed to the bottom end of a vertical axle (40) interdependent with the frame (70) of the extraction device (30).

The extraction device (30) also includes an actuator (50) designed to raise the unit including the wedge, the means of gripping the wedge and the jacks, as soon as the wedge has been extracted, i.e. as soon as it is no longer held in place by the conductors. This actuator is a pneumatic jack (51). The means of gripping (31) the wedge is fixed to the lower end of the axle (40), which is itself an extension of the piston stem (52) of actuator (50). During extraction, all the jacks (324, 325) and the actuator (50) operate simultaneously: the extraction force exerted on the wedge (20), provided by the jacks (324, 325), substantially greater than the force supplied by the actuator (50), is applied only until the wedge breaks away from the conductors, at which point the jacks again operate in low pressure-high flow rate mode and only the raising force of the actuator (50) can be operative.

The extraction device (30) also includes a frame (70) onto which is fixed said actuator (50). Said frame includes means of fixing, so that it can be handled by transport and lifting means. It also includes fairing (71) which delimits the space in which the unit including the wedge (20) and the means of gripping (31) the wedge must move after said wedge has been extracted and which provides protection for the operators working near the extractor against the extracted moving parts.

The extraction device is also provided with a means of guidance (318) which makes it possible to guide said means of gripping (31) the wedge in a substantially vertical direction as the extracted unit (wedge, means of gripping the wedge, jack(s)) rises. This means of guidance includes a set of rollers (319) fastened to the fixing part (313) and designed to run on the vertical wall of the frame (70).

The frame is also provided with a cooling box, which is placed above the wedge, the top of which is equipped with a cooler operating by Venturi effect. The Venturi effect obtained makes it possible to significantly increase the air flow available (by a factor of at least 10) and the air flow so generated is directed towards said wedge.

The invention claimed is:

1. Extraction device designed to extract a short-circuiting wedge, said wedge having been inserted between two conductors to take an electrolytic cell off line, each conductor having at least one upper horizontal face and one substantially vertical face, the substantially vertical face of each conductor being placed opposite the substantially vertical face of the other conductor, the two substantially vertical faces thereby delimiting an air-gap designed to receive said short-circuiting wedge, said wedge comprising two substantially parallel faces, which converge slightly to a bottom of said wedge when said wedge is placed so as to occupy said air-gap, said device including a means of gripping said wedge, wherein said device includes at least two jacks, with at least one of the jacks positioned in conjunction with the upper horizontal face of each conductor, each jack being directed vertically and comprising a body and a piston associated with a piston stem, wherein each jack is configured such that:
   a) one of said stem or said body is interdependent with at least one horizontal support face directed downwards and configured so that, when said extraction device is placed above said wedge to extract the wedge, said upper horizontal face of the conductor is in line with said horizontal support face, and
   b) the other of said body or said stem is connected to said means of gripping said wedge, so that, when said jacks are actuated to extract the wedge, said jacks are configured to exert opposing forces on said conductors and said wedge, tending to separate said conductors and said wedge, characterized in that said means of gripping the wedge includes a fixing part fixed to a bottom end of a vertical axle interdependent with a frame of the extraction device and globally in the shape of an upside-down U having two legs being placed on either side of the wedge and being provided with aligned bores designed for a locking axle to pass through them, the locking axle being laid out laterally and moving in a common plane of symmetry of each jack.

2. Extraction device according to claim 1 characterized in that each jack is a hydraulic actuating cylinder.

3. Extraction device according to claim 2 characterized in that each jack is a double-acting jack powered by a hydraulic circuit including a low-pressure unit and a pressure intensifier connected to the circuit feeding a chamber on a piston side, arranged so that each jack is configured to initially operate at low pressure and with high flow rate, as long as the horizontal support face of the last stem has not come into contact with the upper horizontal face of a conductor; then, when differences in levels have been so corrected, in high-pressure mode, with low flow rate, so that each jack is configured to exert opposing forces on said conductors and on said wedge, tending to separate said conductors and said wedge.

4. Extraction device according to claim 1, in which a top part of said wedge, designed to remain above the air-gap of the conductors, has a horizontal bore passing through an entire thickness of the wedge, and in which the locking axle is actuated by a locking jack interdependent with said fixing part and which inserts said locking axle inside the horizontal bore of the wedge and the bores of the legs of said fixing device for gripping the wedge.

5. Extraction device according to claim 1 characterized in that the device also includes an actuator designed to raise, as soon as the wedge is no longer held by the conductors, a unit including the wedge, the means of gripping said wedge and said jacks so that said unit comes out of said air-gap between said conductors.

6. Extraction device according to claim 5, characterized in that said actuator is a pneumatic jack.

7. Extraction device according to claim 5, characterized in that said jacks and said actuator are configured to operate simultaneously during the extraction of said wedge.

8. Extraction device according to claim 5 characterized in that the device also includes said frame onto which is fixed said actuator, said frame including means of fixing, so that said frame can be handled by transport and lifting means.

9. Extraction device according to claim 8, characterized in that said frame is provided with means of centering configured to guide said extraction device during vertical movement downwards towards a predefined position in relation to said conductors, the support faces being placed in line with the upper horizontal faces of said conductors.

10. Extraction device according to claim 8, characterized in that said frame also includes fairing which delimits the space in which the unit including the wedge and the means of gripping the wedge must move after said wedge has been extracted and which provides protection for operators working near said extractor.

11. Extraction device according to claim 8, characterized in that the device includes, fixed to said frame, a cooling box which is placed above the wedge and a top of which is equipped with a cooler operating by Venturi effect.

12. Extraction device according to claim 1, characterized in that said fixing part of the wedge is fixed at the bottom end of the vertical axle, wherein the vertical axle is an extension of the stem of the actuator.

13. Extraction device according to claim 1 characterized in that the device includes a means of guidance configured to guide said means of gripping the wedge in a substantially vertical direction as an extracted unit including said wedge, said means of gripping the wedge, and said jacks rises.

14. Extraction device according to claim 1, characterized in that the device includes a means of guidance configured to guide said means of gripping the wedge in a substantially vertical direction as an extracted unit including said wedge, said means of gripping the wedge, and said jacks rises in which said means of guidance includes a set of rollers fixed onto the fixing part and placed so that said rollers run on a vertical wall of frame when said fixing part moves in relation to said frame.

15. Extraction device designed to extract a short-circuiting wedge, said wedge having been inserted between two conductors to take an electrolytic cell off line, each conductor having at least one upper horizontal face and one substantially vertical face, the substantially vertical face of each conductor being placed opposite the substantially vertical face of the other conductor, the two substantially vertical faces thereby delimiting an air-gap designed to receive said short-circuiting wedge, said wedge comprising two substantially parallel faces, which converge slightly to a bottom of said wedge when said wedge is placed so as to occupy said air-gap, said device including a means of gripping said wedge, wherein said device includes at least two jacks, with at least one of the jacks positioned in conjunction with the upper horizontal face of each conductor, each jack being directed vertically and comprising a body and a piston associated with a piston stem, wherein each jack is configured such that:

a) one of said stem or said body is interdependent with at least one horizontal support face directed downwards and configured so that, when said extraction device is placed above said wedge to extract the wedge, said upper horizontal face of the conductor is in line with said horizontal support face, and b) the other of said body or said stem is connected to said means of gripping said wedge, so that, when said jacks are actuated to extract the wedge, said jacks are configured to exert opposing forces on said conductors and said wedge, tending to separate said conductors and said wedge, characterized in that the device also includes an actuator designed to raise, as soon as the wedge is no longer held by the conductors, a unit including the wedge, the means of gripping said wedge and said jacks so that said unit comes out of said air-gap between said conductors, characterized in that the device also includes a frame onto which is fixed said actuator, said frame including means of fixing, so that said frame can be handled by transport and lifting means, and characterized in that the device includes, fixed to said frame, a cooling box which is placed above the wedge and a top of which is equipped with a cooler operating by Venturi effect.

* * * * *